United States Patent [19]

Loos et al.

[11] 4,045,917
[45] Sept. 6, 1977

[54] GEAR GRINDING MACHINE

[75] Inventors: Herbert Loos, Dorfen; Max Seitz, Munich; Manfred Erhardt, Puchheim, all of Germany

[73] Assignee: Carl Hurth Maschinen- und Zahnradfabrik, Munich, Germany

[21] Appl. No.: 632,080

[22] Filed: Nov. 14, 1975

[30] Foreign Application Priority Data

Dec. 13, 1974 Germany ............................ 2459033

[51] Int. Cl.² .......................... B24B 19/00; B24B 17/00
[52] U.S. Cl. .................................................. 51/123 G
[58] Field of Search .............. 51/123 G, 124 R, 94 R, 51/95 GH, 100 R

[56] References Cited

U.S. PATENT DOCUMENTS

| 3,263,372 | 8/1966 | Erhardt | 51/123 G |
| 3,906,677 | 9/1975 | Gunter et al. | 51/123 G |

FOREIGN PATENT DOCUMENTS

| 1,310,870 | 3/1973 | United Kingdom | 51/123 G |

*Primary Examiner*—Harold D. Whitehead
*Assistant Examiner*—Nicholas P. Godici
*Attorney, Agent, or Firm*—Blanchard, Flynn, Thiel Boutell & Tanis

[57] ABSTRACT

Adjusting device for an oscillating workpiece. In one type of gear grinding machine, there is provided means for effecting oscillation of the workpiece simultaneously and in synchronism with reciprocation thereof in order to enable a substantially involute curve to be ground onto the workpiece by a grinding wheel which is fixed excepting for its rotation. In such machine, this oscillation is created by at least one cam fixed to the workpiece spindle together with at least two bands fixed at one of their respective ends to such cam and at the other of their respective ends to a fixed portion of the machine with the bands being wrapped in opposite directions at least partially around such cam. Thus, sidewise reciprocating movement of the workpiece spindle effects oscillation of same in a known manner according to the curve provided on said cams. In the present invention, there is provided means for imposing a further controlled movement onto the workpiece spindle either transversely or longitudinally of its axis, or both, in order to provide modification as desired of the surface being ground onto a workpiece tooth and particularly to cause such surface to deviate in a desired manner from a theoretically perfect involute contour.

8 Claims, 7 Drawing Figures

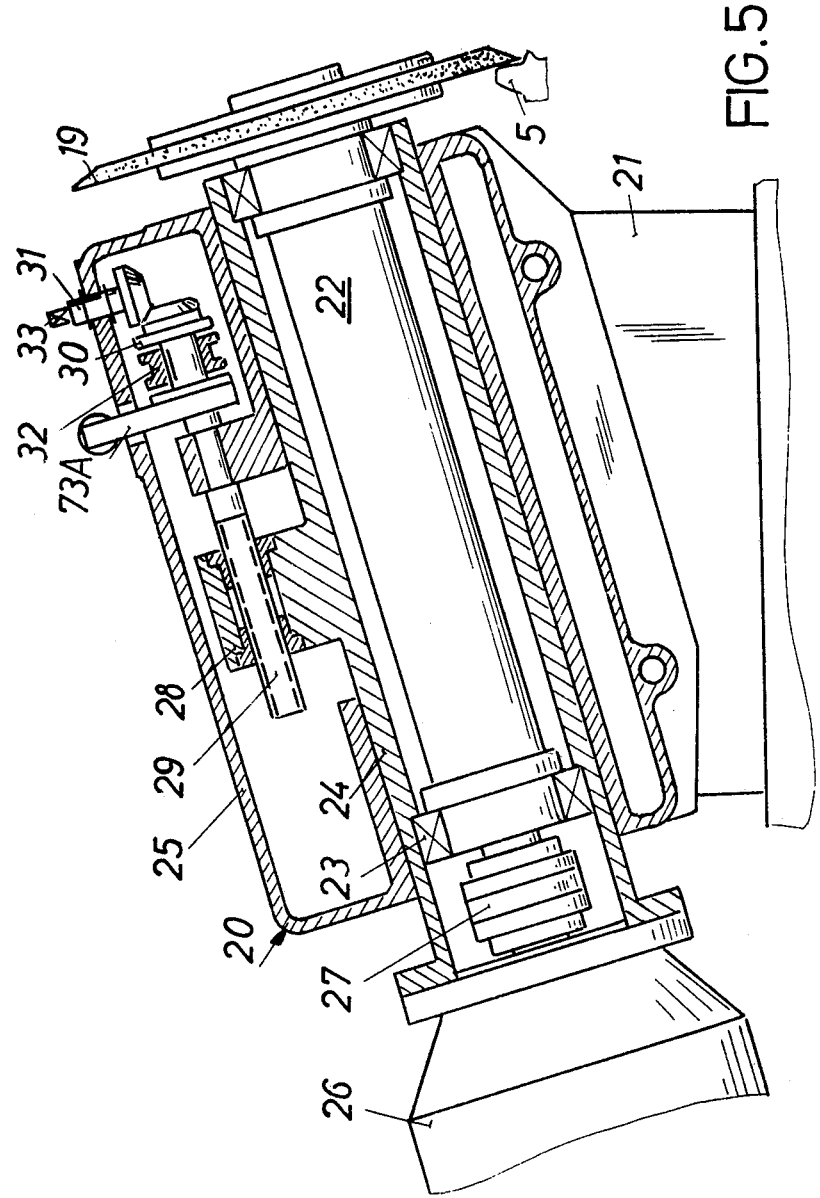

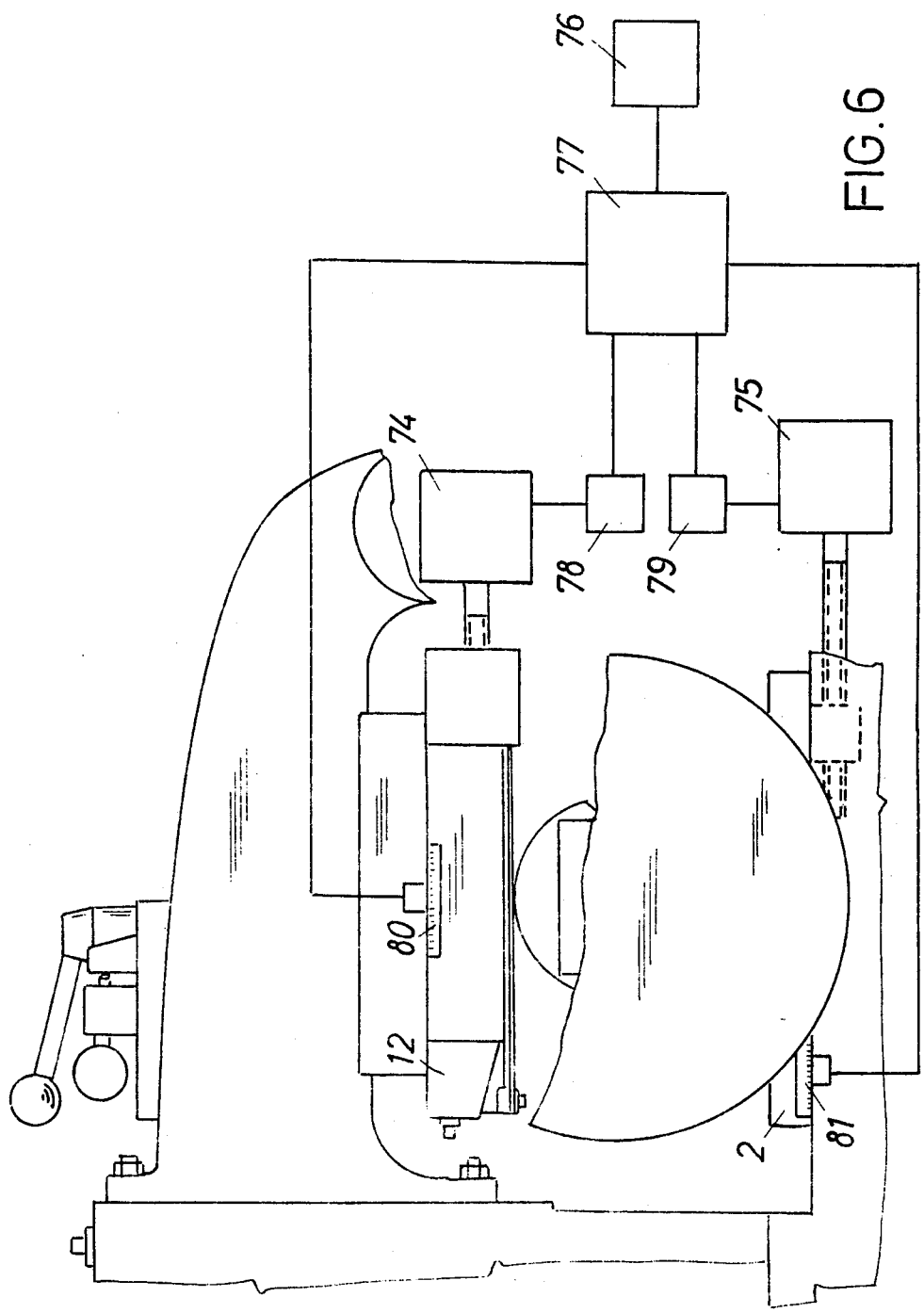

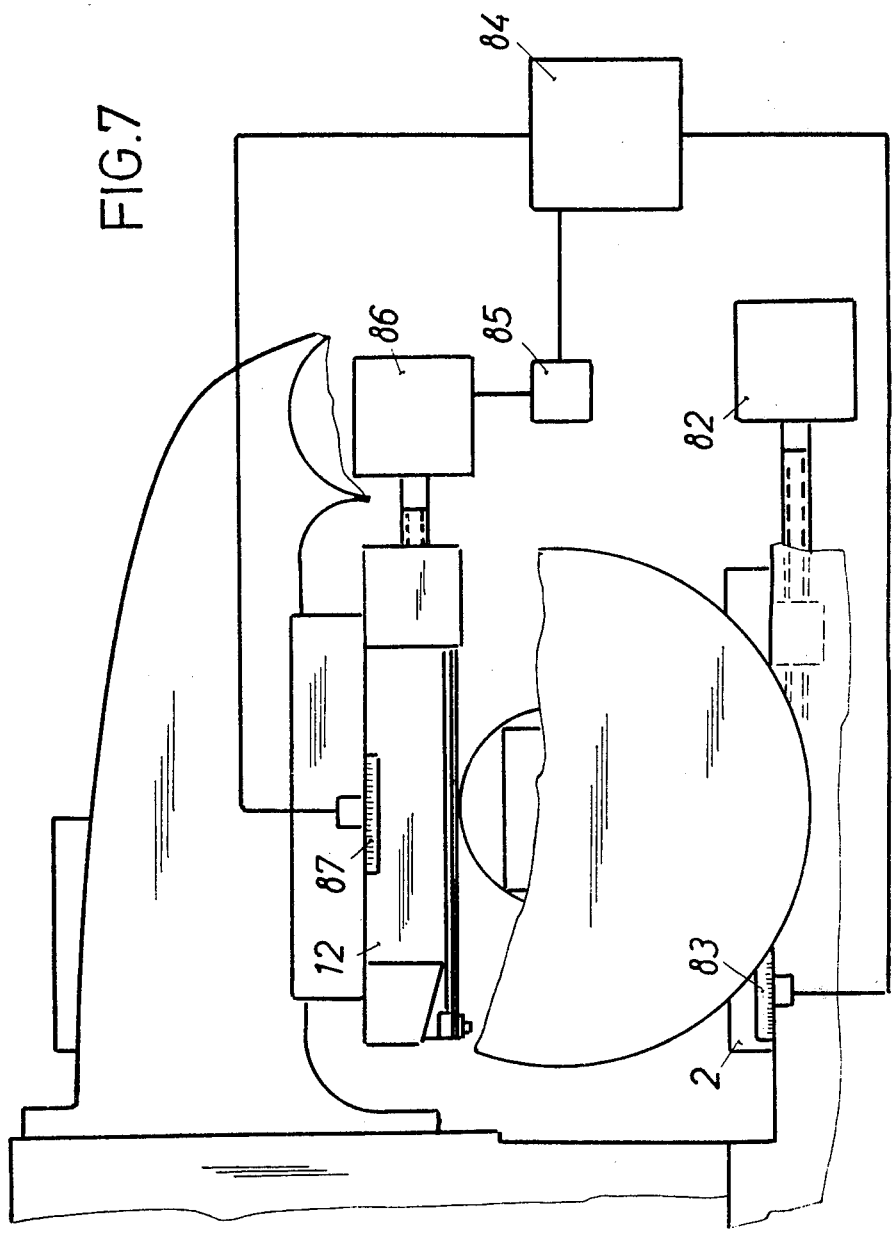

GEAR GRINDING MACHINE

CROSS REFERENCE TO RELATED APPLICATION

This application is related to a further application filed concurrently herewith and assigned to the same assignee as the present application bearing German Ser. No. P 24 55 808.5 filed Nov. 26, 1974, namely Ser. No. 632 069, filed Nov. 14, 1975.

FIELD OF THE INVENTION

The invention relates to a gear grinding machine, and refers particularly to a gear grinding machine having a rolling drive wherein the rolling portion of the rolling movement is effected by roll bands which are secured on at least one roll cam for rolling along same, in which an indexing control device indexes the workpiece from tooth to tooth and is provided between the workpiece spindle and the element (the roll cam sleeve) which carries the roll cam or cams and in which a carriage which carries both the workpiece and the roll cam is reciprocated in synchronism with the rolling movement in a direction transverse to the axis of the workpiece spindle and without appreciable longitudinal movement parallel to the axis of the workpiece spindle. Such machines are used for the precision grinding of straight or helically toothed gears, in particular precision master gears and tools for gear shaving and gear rolling. Such a machine is manufactured and sold by Carl Hurth Maschinen- und Zahnradfabrik of Munich, Germany, under the designation of SRS 400 Shaving Cutter and Grinding Machine and is illustrated by its bulletin SRS 400 1.0/3.75/e.

BACKGROUND OF THE INVENTION

A gear grinding machine is already known in which an additional transverse movement of the workpiece tooth relative to the grinding wheel is effected by changing the tension on at least one of the roll bands. Same is controlled by a guide bar which is in turn responsive to the reciprocal transverse movement of the roll band carriage. (German Pat. No. 2,059,521 and British Pat. No. 1,310,870.) This control is incomplete because the change in tension of the roll bands and thus their deflection is limited. Further there are some noticeable effects from temperature changes.

Therefore, the basic purpose of the invention is a gear grinding machine of the above-described type having a control, which sufficiently effects stretching of the roll bands that the correction of the workpiece tooth surface does not depend on the condition of the roll bands so that for example a temperature above the heat expansion of the roll bands does not influence the surface correction of the workpiece.

SUMMARY OF THE INVENTION

The basic purpose of the invention is attained with a gear grinding machine of the type aforesaid including also mechanism for carrying out an additional transverse movement of a workpiece tooth relative to the grinding wheel and particularly to such a mechanism in which at a substantially uniform tension of the roll bands the pressure of the grinding wheel onto the tooth surface of the workpiece is controlled by a stored input.

Such a machine has also the advantage that no limits are set with respect to the distortion of the roll bands and thus with respect to the amount of correction and particularly that the roll bands cannot be overextended. Further, forces occur during distortion of the roll bands, which among others have an unfavorable effect on the carriage guide. A simple embodiment which is suitable for an effective machine shop operation, in particular for many repeated cases, is obtained by providing that the storage input is a scannable template.

A machine which is controlled by an input stored numerically on a data carrier is operable as to a wide range of adjustment possibilities without the inconvenience of changing templates.

From the above-indicated principles some advantageous developments can be derived. Means for synchronously controlling the reciprocation of the roll band holder offer the possibility of the good guiding and solid support of the elements which reciprocate during the additional transverse movement.

Since it is advantageous if the additional movement starts as close as possible to the work place, namely at the workpiece, it can be advantageous if the additional movement is started between the roll cam and the workpiece. This can be accomplished advantageously by providing that an element, such as the indexing control mechanism provided between the roll cam and the workpiece, is controlled for additional synchronous reciprocation. A different possibility exists in making the workpiece spindle of two parts telescopically related to each other and to provide that such two parts are movable relative to one another by helical teeth. Thus, if one of these parts, namely the one which is connected to the workpiece, is held axially and if the other one is moved axially thereto, the axially held part carries out a rotating additional movement according to the invention.

According to a different embodiment of the invention, the copying device or the numerical control causes the grinding wheel spindle to reciprocate relative to the tooth surface of the workpiece. It has been found that the grinding wheel spindle reacts in an extremely sensitive manner.

Of course, it is conceivable that if the grinding wheel is held axially, as in machines without the invention, and the machine frame is controlled in the manner as provided by the invention to be transversely moved and driven, the effect desired by the inventors is obtained. For this purpose it is possible either to reciprocate in a controlled manner a table which carries the workpiece, or to provide that the drive for the reciprocating roll cam carriage can receive a superposed additional movement, for example by means of a differential.

Protection is desired not only for the patent claims in their direct wording but basically also for the kinematic reversals and their derivations.

Further advantages and characteristics of the invention will be apparent from the following description.

BRIEF DESCRIPTION OF THE DRAWINGS

The invention will be discussed in connection with exemplary emmbodiments which are illustrated in FIGS. 1 to 7.

FIG. 5 is a longitudinal cross-sectional view of the grinding wheel spindle head with grinding wheel spindle and adjusting device according to the invention.

FIG. 6 is a view corresponding to FIG. 2, however, with the indexing control mechanism being only partly broken off and with a block diagram for a numerical control.

FIG. 7 illustrates a simplified view corresponding to FIG. 6 having a block diagram for a control by means of a computer.

DETAILED DESCRIPTION

Figure 1:
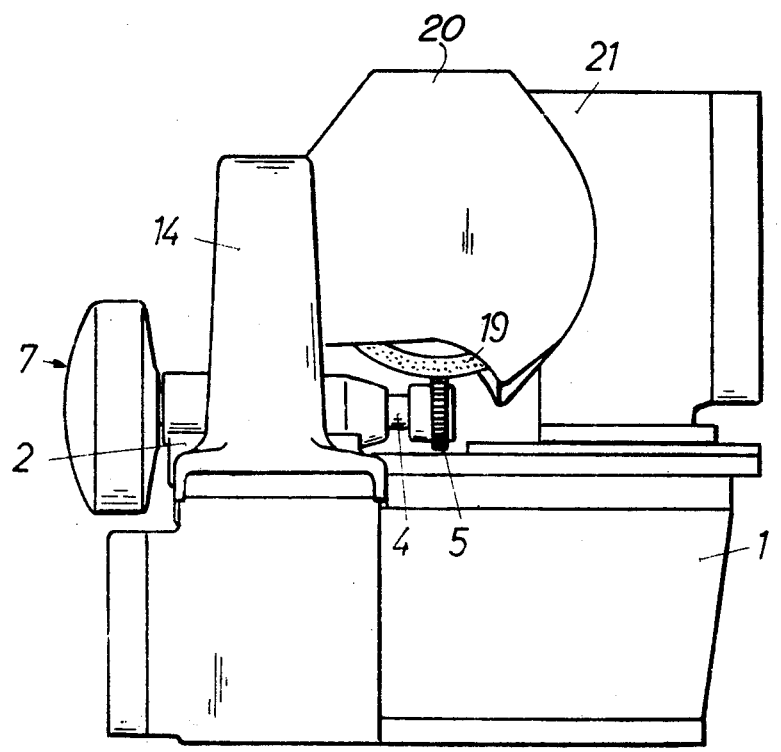
FIG. 1 illustrates a gear grinding machine on which the invention can be applied.

A roll cam carriage 2 is supported for reciprocal movement between points 3A and 3B on a track 3 and drivable therefor in a suitable guide on a machine base 1 of a gear grinding machine (FIG. 1). The means for the reciprocal driving are known and are therefore not shown. A workpiece spindle 4 which is known and therefore not illustrated in detail is rotatably supported so that the axis thereof is transversely to the direction of movement of the roll cam carriage. The workpiece spindle 4 is enclosed by a roll cam sleeve 6 at its end remote from the workpiece 5. The workpiece spindle 4 is, together with the roll cam sleeve 6, arranged for back-and-forth movement transversely of the axis of the workpiece spindle but same are both held against longitudinal movement parallel to such axis. At the end remote from the workpiece, the workpiece spindle 4 and roll cam sleeve 6 are coupled to a conventional indexing control mechanism 7, of which FIG. 1 illustrates the housing. The roll cam sleeve 6 and the workpiece spindle 4 can be supported in the same bearings, preferably a roller bearing in which the rolling elements are installed for minimum play. The workpiece 5, a precision master gear, shaving gear, main pinion or other gear, can be mounted on the end of the workpiece spindle remote from the indexing control mechanism 7. The roll cam 8 is mounted interchangeably on the roll cam spindle 6 and is advantageously mounted adjustably relative thereto. Deformable roll bands 9, 10 are secured at one end of each thereof on the roll cam and said roll bands are fixed, as by screws 11, at their other ends in a replaceable manner onto a roll band holder 12. The roll band holder 12 is supported in a suitable guideway, not illustrated in detail, on a side arm 13 and is movably transversely to the axis of the workpiece spindle. The side arm is guided in a vertical direction on a stand 14, which is fixed, as by screws, on the machine base 1, by means of a guideway 15. A screw 16 effects movement and clamp screws 17 are used for locking. The free end of the side arm is supported elevationally adjustable and tightly clampable to a holder 18.

The grinding wheel 19 which, for working a workpiece tooth surface, can engage a tooth space of the workpiece 5, is elevationally adjustable in a grinding wheel spindle head 20 and is secured at an angle to the workpiece tooth, for the purpose of adjusting the pressure angle, on a wheel stand 21. The wheel stand 21 can be adjusted to the desired sloped angle of the workpiece teeth on the machine base 1. FIG. 5 schematically illustrates a longitudinal cross-sectional view of the grinding wheel spindle head. The grinding wheel 19 is mounted onto a grinding wheel spindle 22, which is supported rotatably with bearings 23 in a quill 24. The quill 24 is supported longitudinally movably but not rotatably in the spindle head housing 25. An electric motor 26 is flanged to the free end of the spindle head housing, which electric motor is coupled, for example with an elastic coupling 27 to the grinding wheel spindle. A spindle nut 28 is provided on the quill, into which spindle nut engages a screw 29. Conventional means are provided for a play-free engagement. By rotating this screw, the grinding wheel can be adjusted axially. A pair of bevel gears 30, 31 are provided for this purpose, of which pair the one gear 30 may be coupled with the screw by means of a clutch 32, while the other gear 31 is equipped with means 33 for manual rotation or with a motor. The clutch 32 can also provide the connection to a second drive which will be described later on.

Figure 2:
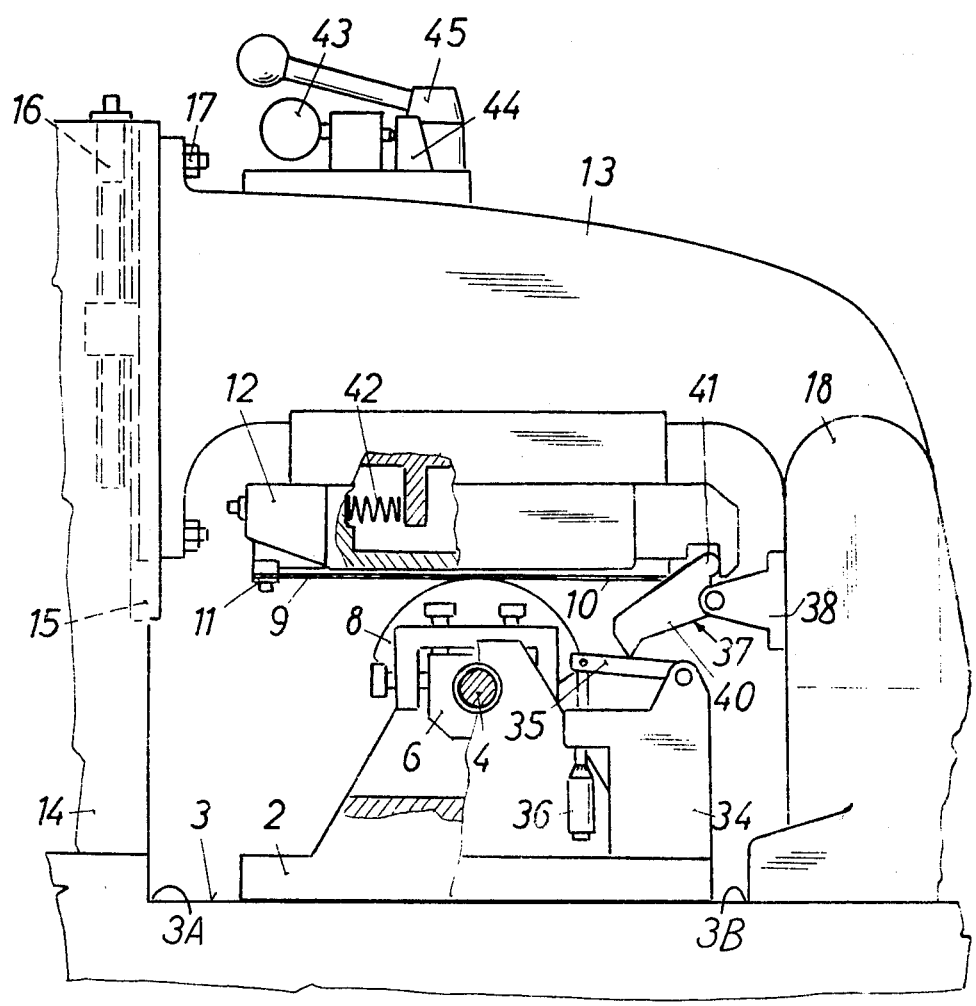
FIG. 2 illustrates in an enlarged scale a section of the machine according to FIG. 1, namely from the left side without the indexing control mechanism, so that roll cam and roll band holder are visible.

FIG. 2 illustrates more in detail one embodiment of the invention. A guide bar 35 is supported pivotally on a holder 34 on the roll cam carriage 2, which, as stated above, can be reciprocated transversely to the axis of the workpiece spindle 4. The angle of traverse or the angle of the guide bar 35 can be adjusted by a micrometer screw 36 or the like. It is also possible to use in place of the guide bar an interchangeable template. This guide bar 35 or the template is scanned by an electric, hydraulic, pneumatic or — as shown — a mechanical feeler 37. The mechanical feeler 37 is, in this embodiment, a two-arm lever which pivotally is supported on a fixed point, for example on the holder 18, through means of a bearing block 38. In order to effect a reduction of speed from the guide bar 35 to the controlled movement, a longer lever arm 40 is associated with the guide bar, while the shorter lever arm 41 engages the roll band holder. A return spring 42 is provided in or on the roll band holder, which spring assures that the feeler 37 continually bears against the guide bar 35. During the reciprocal movement of the roll band carriage 2, the feeler 37 slides along on the guide bar 35. Depending on the slope of the guide bar, an additional transverse movement is in this manner applied to the roll band holder 12, which lends an additional rotary movement to the roll cam and thus also to the workpiece. Depending on the slope of the guide bar or the shape of the template, the workpiece tooth surface is ground as desired in a manner other than the theoretical involute.

The micrometer screw 36 can be supplemented by a not-shown dial guage to facilitate adjustment of the guide bar 35. Above the side arm, there is provided a second dial guage 43, which is activated by a two-arm lever 44. The not-shown free end thereof engages the roll band holder 12. The movement of the roll band holder 12 can thus be read. The roll band holder 12 can be locked by a clamping device 45. The copying device must then be turned off.

Figure 3:
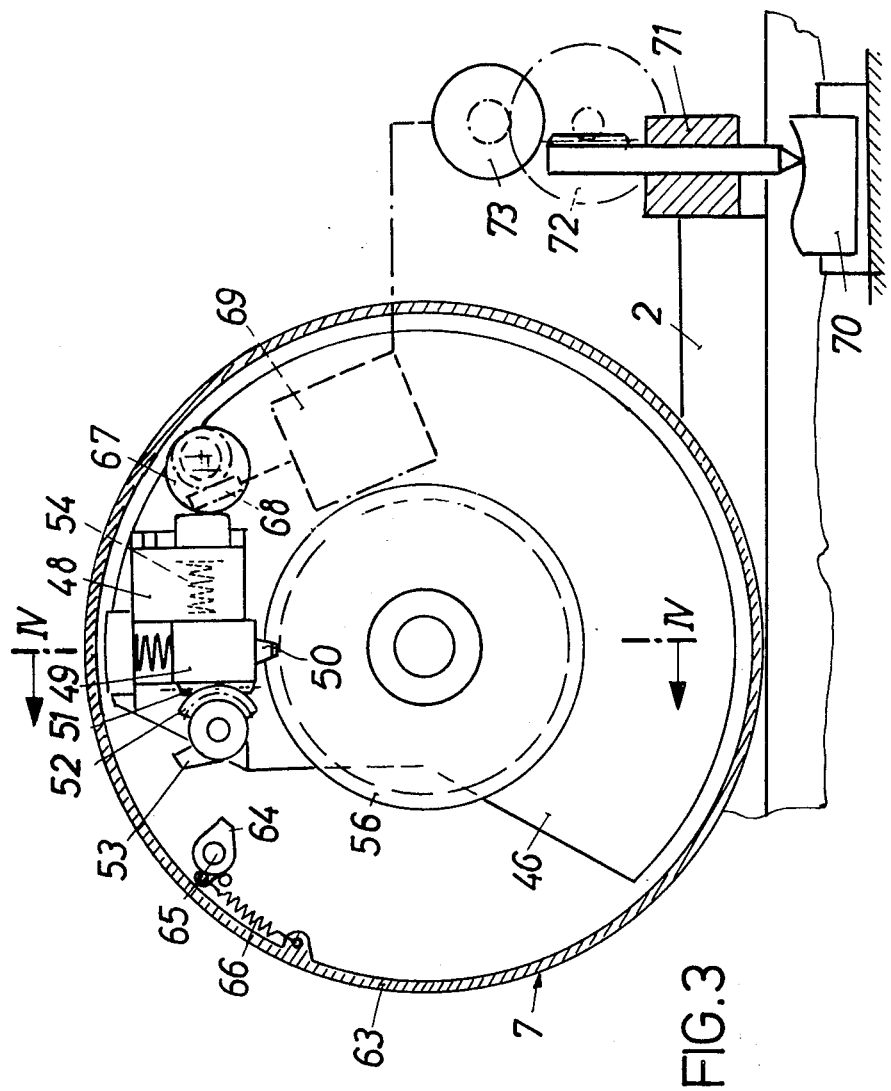
FIG. 3 schematically illustrates in an enlarged scale an indexing control mechanism which is developed according to the invention.
Figure 4:
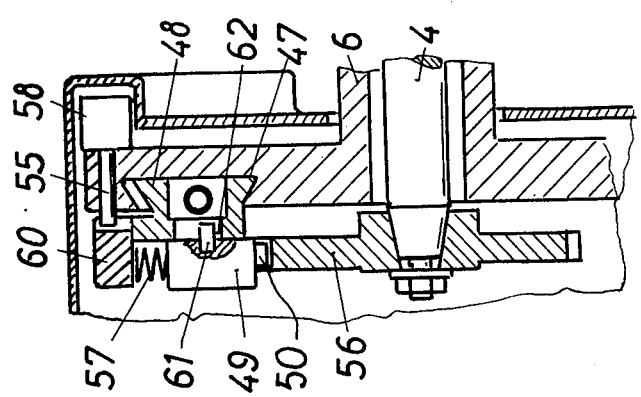
FIG. 4 is a schematic cross section along the line IV—IV of FIG. 3.

FIGS. 3 and 4 show an embodiment of the invention, in which there is created an additional transverse movement on the indexing-control mechanism 7. The free end of the roll cam sleeve 6 carries a rocker arm 46, in which is provided an arcuate cam groove 47 which is centered on the center of the swinging or rotatable movement of the sleeve 6. An indexing carriage 48 is guided longitudinally movably in said cam groove 47. An indexing carriage 49 is guided longitudinally movably at right angles thereto, namely radially. The indexing carriage 49 has a projection 50 which is aligned radially of the workpiece axis. Rack teeth 51 are provided laterally on the indexing carriage 49, which teeth are engaged by a pinion 52 which is rotatably supported on the indexing carriage 48. The pinion 52 has a radially directed pawl tooth 53. The spring 54 urges the indexing carriage 48 to the right as seen in FIG. 3. An indexing pin 55 is supported on the rocker arm and is movable by an electromagnet 58 or other suitable drive mechanism. When the device of the invention, namely the copying device, operates, the indexing pin 55 is retracted as shown in FIG. 4. An index plate 56 is interchangeably mounted on the end of the workpiece spindle 4, which index plate is provided in a conventional manner with indexing teeth corresponding with the workpiece tooth pattern. The above-mentioned projection 50 engages a gap of these indexing teeth in response to the pressure of a spring 57 which is inserted between the indexing carriage 49 and the counter bearing 60 at the indexing carriage. Also a stop pin 61 is provided on the indexing carriage 49, which stop pin extends into a slot 62 of the indexing carriage 49 in order to prevent the spring 57 from pressing the indexing carriage 49 too far inwardly during exchange of the index plate 56. A swivel cam 64 is supported pivotally at a limited angle about the axis of a pin 65 in the stationary housing 63 of the indexing-control mechanism 7. A tension spring 66 pulls the swivel cam 64 against a non-illustrated stop. If the rocker arm 46 according to FIG. 3 is swung counterclockwise (indexing pin 55 is then in engagement), the pawl tooth 53 contacts the swivel cam 64 and the latter yields to the force of the spring 66. During return movement the swivel cam 64 cannot yield and this causes the pinion 52 to be rotated counterclockwise and the projection 50 is lifted out of the index plate 56 and falls then into the next tooth space. This indexing cycle is known.

The indexing carriage 48 is urged against an eccentric 67 by the spring 54, which eccentric is supported in the rocker arm 46. This eccentric can be driven through a reduction gear, indicated schematically as a worm gearing 68, by an electric rotation receiver 69 or other equivalent means. A template 70 or the like is secured exchangeably on the machine frame. A feeler 71 which scans the template is supported in the reciprocating roll cam carriage 2, which feeler acts through a schematically indicated transmission gearing 72 or the like onto an electric rotation transmitter 73 or an equivalent element. Rotation transmitter 73 and rotation receiver 69 are electrically operatively connected so that they act as a single component. In place thereof it is also possible to use other electric, hydraulic, pneumatic or mechanic transmission gearings and if desired step-up or reduction gears. It is important that during scanning of the template its shape is transmitted with the necessary reduction of speed onto the indexing carriage, so that the workpiece spindle 4 receives a rotary movement which is expressed as an additional transverse movement, namely through the projection 50 and the index plate 56.

In the embodiment according to FIG. 5, the clutch 32 can be engaged in response to a lever 73A which is operatively connected to a template or a guide bar similar to that described in the preceding exemplary embodiments. The movement of this lever is transmitted to the screw 29, which lends the grinding spindle 22 an axially reciprocating additional transverse movement, as controlled by the template or the guide bar.

FIG. 6 illustrates an exemplary embodiment of the invention having a numerical control, which acts onto the additionally movable roll band holder 12. The numerical control can of course also be applied on all other afore-mentioned or described types of drive for the additional transverse movement. The roll cam carriage 2 and the roll band holder 12 are driven each by an electric of hydraulic servomotor 74, 75 or by each one stepping motor. These motors are controlled by a manual input device 76 or by a perforated tape reader or other data carrier. The two coordinates of the desired profile deviation are fed into such input device. The two coordinates are the contact zone or the height of the tooth on one side, illustrated by the path of the roll cam carriage 2, and the surface deviation from the involute on the other side illustrated by the additional drive of the roll band holder 12. The manual input device acts conventionally onto a known N-C-path control 77, which in turn acts through respective amplifiers onto the said servomotors 74, 75. One linear pick-up 80, 81, from which a feedback to the N-C-path control occurs, is each provided both on the roll band holder 12 and also on the roll cam carriage 2.

FIG. 7 illustrates an exemplary embodiment of the invention having a control by means of a computer. For this it is advantageous to trace back the points of the desired surface deviation to one single equation which is valid for all sequences of points. It is then possible to program a computer to satisfy only this one equation. Thus it is possible to connect the points of the corrected tooth surface with a hyperbola of $n$ degree, which reads $$y = f(x) = a_0 + a_1x + a_2x^2 + \ldots a_nx^n \qquad (A),$$

whereby the coordinate $x$ is illustrated by the uncorrected roll cam adjustment or by the path of the roll cam carriage 2 and the coordinate $x$ by the additional transverse movement of the roll band holder.

The roll cam carriage 2 is driven back and forth by a motor 82. A linear pick-up 83 is provided on the roll cam carriage 2, at which the coordinate $x$ is picked off and is introduced into the computer 84. Further, the constants $a_o, a_1, a_2 \ldots$ are introduced either manually or by a data carrier into the computer. The servomotor 86 is controlled through an amplifier 85 with the calculated result, which servomotor drives the roll band holder 12 for its additional transverse movement. The roll band holder 12 can be provided additionally with a second linear pick-up 87, which creates a feedback to the computer or introduces its measured values for correction into the computer.

A different advantageous possibility for computer control is found in tracing the curve path of the corrected involute back to Fourier's series $$y = f(x) = b_o + b_1\cos x + b_2\cos 2x + b_3\cos 3x \ldots + a_1\sin x + a_2\sin 2x + a_3\sin 3x \ldots \qquad (B).$$

The constants of the equation (B) are determined according to the Fourier's analysis and are introduced into the computer 84. The linear pick-up gives the coordinate $x$ for the carriage 2 and the computer controls the servomotor through synthesis of the individual harmonics.

Of course, it is also possible to use other computers, for example for general calculating operations. It is also possible to computer control the $x$-coordinate and the motor 82 is then controlled as servomotor through a not-shown amplifier.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A gear grinding machine for grinding teeth on workpieces, comprising:
    a rotatable workpiece holder;
    a rotary grinding wheel having an annular active surface;
    deformable roller motion producing means arranged to reciprocate said workpiece holder in a predetermined path and to simultaneously rock the gear teeth formed on the workpiece about the axis thereof so as to impart to a given tooth flank of the workpiece back-and-forth rolling movements with respect to and along the active surface of said grinding wheel; and
    control means for additionally and synchronously controlling the rotatable reciprocating motion of said workpiece during its range of movement so that the tension on said deformable rolling motion producing means is maintained constant and the workpiece is not subjected to the action of disengaging forces which result from deformation of said rolling motion producing means so that stray movements of said workpiece relative to said active surface are avoided.

2. A gear grinding machine according to claim 1, including indexing control means for indexing said workpiece from tooth to tooth;
    wherein said control means controls said indexing control means to avoid said stray movements of said workpiece relative to said active surface.

3. A gear grinding machine according to claim 1, wherein said control means is a scannable template and means operatively connected to said workpiece holder.

4. A gear grinding machine according to claim 1, wherein said control means includes means comprising information stored numerically on a data carrier.

5. A gear grinding machine according to claim 1, wherein said deformable rolling motion producing means includes a roll band holder for holding roll bands and means for effecting a uniform reciprocation thereof.

6. A gear grinding machine according to claim 2, wherein said indexing control means has between said deformable rolling motion producing means and said workpiece additional means for effecting an additional uniform reciprocation of said workpiece holder.

7. A gear grinding machine according to claim 1, including first means for axially reciprocally supporting said grinding wheel spindle and second means for effecting a uniform axial reciprocation of said grinding wheel spindle.

8. A gear grinding machine according to claim 1, including computer means for controlling the pressure of said grinding wheel onto the tooth surface of said workpiece.

* * * * *

UNITED STATES PATENT AND TRADEMARK OFFICE
CERTIFICATE OF CORRECTION

PATENT NO. : 4 045 917
DATED : September 6, 1977
INVENTOR(S) : Herbert Loos, Max Seitz and Manfred Erhardt It is certified that error appears in the above-identified patent and that said Letters Patent are hereby corrected as shown below:

Column 7, Line 12; change "roller" to ---rolling---.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*